US006405593B1

(12) United States Patent
Palfenier et al.

(10) Patent No.: US 6,405,593 B1
(45) Date of Patent: Jun. 18, 2002

(54) SELF-RETAINING TRANSMISSION SENSOR

(75) Inventors: Samuel Roland Palfenier; Stephen G Paddock, both of El Paso, TX (US); Cecilia Hernandez, CD. Juarez Chih (MX)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/543,926

(22) Filed: Apr. 6, 2000

(51) Int. Cl.[7] .................................................. G01P 1/02
(52) U.S. Cl. ......................................................... 73/493
(58) Field of Search ........................ 73/493, 494, 866.5

(56) References Cited

U.S. PATENT DOCUMENTS

| | | | | | |
|---|---|---|---|---|---|
| 4,858,470 A | * | 8/1989 | Kincaid et al. | ............... | 73/654 |
| 5,067,350 A | * | 11/1991 | Grillo et al. | ................... | 73/494 |
| 5,325,734 A | * | 7/1994 | Jordan | ........................ | 73/866.5 |
| 5,495,758 A | * | 3/1996 | Griffen et al. | ................ | 73/493 |
| 5,747,987 A | * | 5/1998 | Smith | ..................... | 324/207.13 |
| 5,922,953 A | * | 7/1999 | Payne et al. | ................... | 73/494 |
| 6,155,114 A | * | 12/2000 | Karino et al. | ................. | 73/493 |

* cited by examiner

Primary Examiner—Richard A. Moller
(74) Attorney, Agent, or Firm—Margaret A. Dobrowitsky

(57) ABSTRACT

A self-retaining transmission sensor includes a sensor housing having a retaining ring extending radially from the sensor housing. When the self-retaining transmission sensor is inserted in a bore in a transmission housing having a diameter slightly smaller than the diameter of the retaining ring, the outer edge of the retaining ring engages the inner wall of the bore and holds the self-retaining transmission sensor firmly in place. Thus, the need for a mounting bracket, a mounting bolt, or a similar device is eliminated.

20 Claims, 1 Drawing Sheet

SELF-RETAINING TRANSMISSION SENSOR

TECHNICAL FIELD

The present invention relates to motor vehicle transmission sensors.

BACKGROUND OF THE INVENTION

Modem motor vehicles are equipped with numerous sensors which provide detailed information regarding the operation of the vehicle. This information may be displayed for a driver or it may be processed and provided to various vehicle control systems. For example, some transmission mounted speed sensors sense a rotating target wheel installed in the transmission and output a signal representing the angular velocity of the target wheel in revolutions per minute (rpm).

Based on the size of the target wheel and the geometry of the vehicle drive train assembly, including the transmission gearing, the drive shaft gearing, the size of the wheels, etc., the rpm of the target wheel can be processed to determine the linear velocity of the vehicle. The velocity may then be displayed to the driver via a speedometer or it may be used by a vehicle speed control system, e.g., a cruise control system, to control the speed of the vehicle.

It happens that some transmission mounted speed sensors are installed such that they protrude through a bore in the transmission housing into the interior of the housing. The bore may be formed with internal threads that engage external threads formed by the sensor housing. This allows the sensor to be screwed into the transmission housing. Alternatively, the sensor may be held in place by a bracket that is otherwise bolted to the transmission housing. The present invention understands that in either situation, the speed sensor is installed in the transmission housing by hand, which increases the production time and cost of the vehicle.

The present invention also understands that when the speed sensor is installed in the transmission it must be spaced from the target wheel a predetermined distance in order to property sense the rotating target wheel. Typically, after the sensor is installed, the gap between the sensor and the target wheel is adjusted by hand, which also increases the production time and cost of the vehicle.

In light of the above problems, the present invention recognizes a need for a transmission mounted sensor which is self retaining and can be installed so that it automatically is spaced from the target wheel a predetermined distance.

SUMMARY OF THE INVENTION

A self-retaining sensor for use in a vehicle transmission includes a sensor housing and a retaining ring extending radially from the sensor housing. The retaining ring engages an inner wall of a bore formed in a transmission housing to hold the sensor within the transmission housing.

In a presently preferred embodiment, the sensor housing defines a distal end and the sensor includes a target wheel slightly distanced from the distal end of the sensor housing. The target wheel includes a plurality of teeth. Preferably, the retaining ring is insert molded in the sensor housing and a flange extends radially from the sensor housing. Also in a preferred embodiment, the sensor housing defines a proximal end and the sensor includes a connector housing that extends from the proximal end of the sensor housing. Preferably, the connector housing is sized and shaped to receive a complementarily sized and shaped connector from a vehicle control system or a display.

In a preferred embodiment, the flange is near the middle of the sensor housing and the retaining ring extends radially from the flange. The bore formed in the transmission housing comprises a first portion, a second portion and a sensor contact face therebetween. Preferably, the diameter of the first portion is slightly larger than the diameter of the sensor housing and the diameter of the second portion is slightly smaller than the diameter of the retaining ring. The sensor is installed in the bore so that the flange contacts the sensor contact face and the retaining ring engages the inner wall of the second portion of the bore.

In another aspect of the present invention, the flange extends radially around the proximal end of the sensor body and the retaining ring extends radially from the sensor body beneath the flange. In this aspect of the present invention, the diameter of the bore is slightly larger than the diameter of the flange and the diameter of the bore is slightly smaller than the diameter of the retaining ring. The retaining ring engages the inner wall of the bore when the sensor is disposed within the bore.

Additionally, in this aspect of the present invention, the distal end of the sensor housing includes an exterior surface that has an at least partially concave curvature and each tooth on the target wheel includes an exterior surface that has an at least partially convex curvature. As intended by this aspect of the present invention, the curvature of the exterior surface of the teeth mirrors the curvature of the exterior surface of the distal end of the sensor housing. The retaining ring includes a plurality of engagement teeth and each engagement tooth is supported by a lateral support ring. In this aspect of the present invention, the lateral support ring is temporarily deformable from a retracted position to an extended position. Accordingly, the lateral support ring moves to the extended position as the sensor is inserted in the bore in the transmission housing and remains in the extended position until the concave exterior surface of the distal end of the sensor housing makes contact with the convex exterior surface of the teeth on the target wheel and the force of insertion is released allowing the lateral support ring to return to the retracted position.

In yet another aspect of the present invention, a sensor assembly for use in a motor vehicle transmission includes a transmission housing that is formed with a bore. A self-retaining sensor, that includes a sensor housing, is disposed within the bore and the sensor is held in place by a retaining ring extending radially from the sensor. Additionally, a target wheel slightly is distanced from the sensor, and the target wheel includes a plurality of teeth.

The present invention will now be described, by way of example, with reference to the accompanying drawings, in which:

DESCRIPTION OF AN EMBODIMENT OF THE INVENTION

Figure 1:
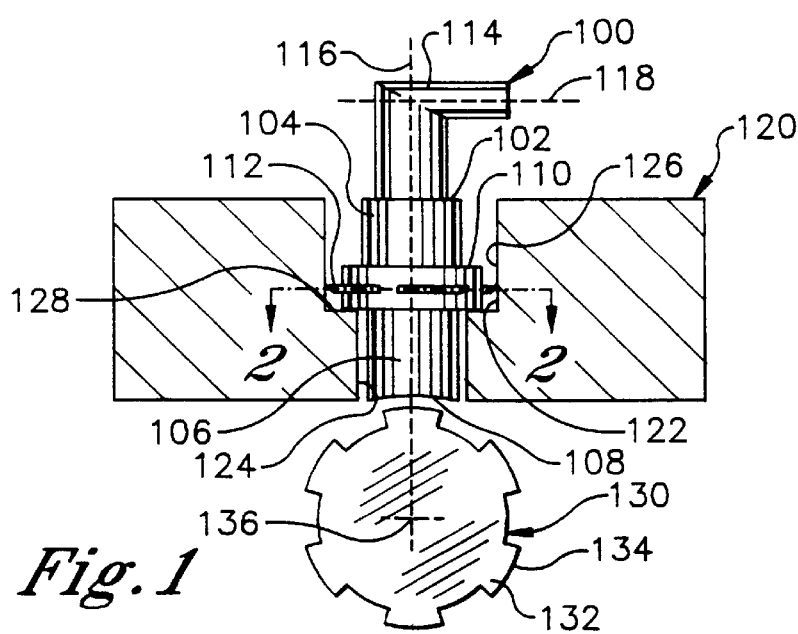
FIG. 1 is a side plan view of the sensor of the present invention with the transmission housing cross-sectioned.

Referring initially to FIG. 1, a self-retaining transmission sensor is shown and generally designated 100. FIG. 1 shows that the self-retaining sensor 100 includes a preferably plastic sensor housing 102 that defines a proximal end 104 and a distal end 106. The distal end 106 of the sensor housing 102 is formed with an exterior surface 108 having a preferably concave curvature.

Figure 2:
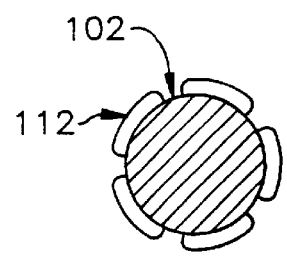
FIG. 2 is a cross-sectional view of the sensor along line 2—2 in FIG. 1.

Referring to FIGS. 1 and 2, a flange 110 extends radially from the sensor housing 102. Furthermore, a preferably metal retaining ring 112 extends radially from the flange 102. In a preferred embodiment, the retaining ring 112 is insert molded in the sensor housing 102. Also in a preferred embodiment, the flange 110, and hence the retaining ring 112, are located near the middle of the sensor housing 102.

Referring specifically to FIG. 1, a preferably plastic connector housing 114 extends from the sensor housing 102. The connector housing 114 is sized and shaped to receive a complementarily sized and shaped connector (not shown) that provides a signal to a vehicle control system or to a display (not shown). It is to be appreciated that the connector housing 114 may be integrally formed with the sensor housing 102. As shown by FIG. 1, the sensor housing 102 defines a first axis 116 and the connector housing 114 defines a second axis 118. In a preferred embodiment, the axes 116, 118 are perpendicular to each other.

Still referring to FIG. 1, a transmission housing 120 is shown. The transmission housing 120 is formed with a continuous bore 122 having a first portion 124, a slightly larger second portion 126, and a sensor contact face 128 therebetween. As seen in FIG. 1, the diameter of the first portion 124 is slightly larger than the diameter of the sensor housing 102. However, the diameter of the second portion 126 of the bore 122 is slightly smaller than the outer diameter of the retaining ring 112. Thus, when the sensor 100 is inserted in the bore 122, the flange 110 formed in the sensor housing 102 contacts the sensor contact face 128 and the retaining ring 112 engages the inner wall of the second portion 126 of the bore 122.

FIG. 1 further shows a preferably metal target wheel 130 having a plurality of teeth 132. Each tooth 132 includes an exterior surface 134 having a preferably convex curvature that mirrors the curvature of the exterior surface 108 of the distal end 106 of the sensor housing 102. As shown in FIG. 1, the target wheel 130 is arranged so that as it rotates, the exterior surface 134 of each tooth 132 is only slightly distanced from the distal end 106 of the sensor housing 102. Additionally, the target wheel 130 defines a center 136 that is aligned with the first axis 116 defined by the sensor housing 102.

Figure 3:
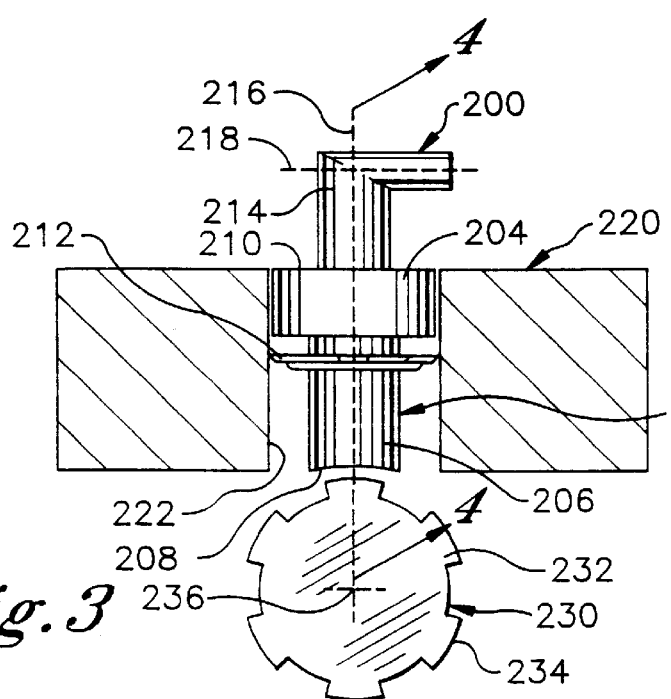
FIG. 3 is a side plan view of an alternative embodiment of the sensor with the transmission housing cross-sectioned.
Figure 4:
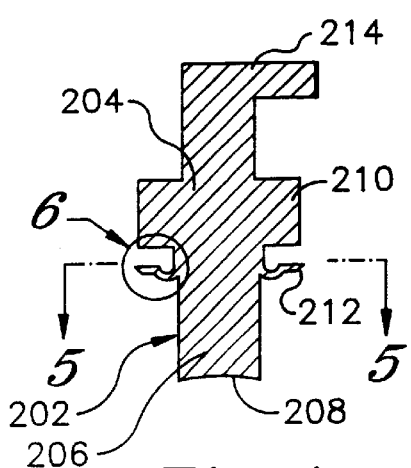
FIG. 4 is a cross-sectional view of the alternative sensor along line 4—4 in FIG. 3.
Figure 5:
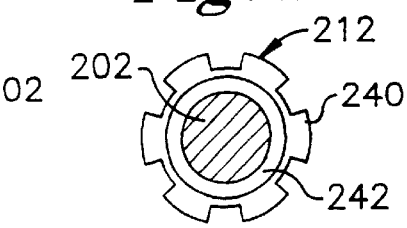
FIG. 5 is a cross-sectional view of the alternative sensor along line 5—5 in FIG. 4.

Referring now to FIG. 3, an alternate embodiment of the self-retaining sensor is shown and generally designated 200. FIGS. 3 through 5 shows that this embodiment of the sensor 200 includes a plastic sensor housing 202 that defines a proximal end 204 and a distal end 206. Moreover, the distal end 206 of the sensor housing 202 includes an exterior surface 208 having a generally concave curvature. Extending radially from the proximal end 204 of the sensor housing 202 is a flange 210 that may be integrally formed with the sensor housing 202. A retaining ring 212 also extends radially from the sensor housing 202 immediately beneath the flange 210. It is to be appreciated that the retaining ring 212 is insert molded into the sensor housing 202.

FIGS. 3 and 4 also show that a plastic connector housing 214 extends from the sensor housing 202. The connector housing 214 is sized and shaped to receive a complementarily sized and shaped connector (not shown) that provides a signal to a vehicle control system or to a display (not shown.) It is to be appreciated that the connector housing 214 may be integrally formed with the sensor housing 202. Additionally, as shown by FIGS. 3 and 4, the sensor housing 202 defines a first axis 216 and the connector housing 214 defines a second axis 218 that is perpendicular to the first axis 216.

Referring specifically to FIG. 3, a transmission housing 220 is shown. The transmission housing 220 is formed with a bore 222 having an inner diameter. FIG. 3 shows the sensor 200 disposed within the bore 222 formed in the transmission housing 220. As shown, the outer diameter of the flange 210 is slightly smaller than the inner diameter of the bore 222. Conversely, the outer diameter of the retaining ring 212 is slightly larger than the inner diameter of the bore 222. Accordingly, when the sensor 200 is inserted in the bore 222, the retaining ring 212 engages the inner surface of the bore 222 and holds the sensor 200 securely in place.

Still referring to FIG. 3, a preferably metal target wheel 230 having a plurality of teeth 232 is shown. Each tooth 232 includes an exterior surface 234 having a preferably convex curvature that mirrors the curvature of the exterior surface 208 of the distal end 206 of the sensor housing 202. As shown in FIG. 3, the target wheel 230 is arranged so that as it rotates the exterior surface 234 of each tooth 232 is only slightly distanced from the distal end 206 of the sensor housing 202. Additionally, the target wheel 230 defines a center 236 that is aligned with the first axis 216 defined by the sensor housing 202.

Figure 6:
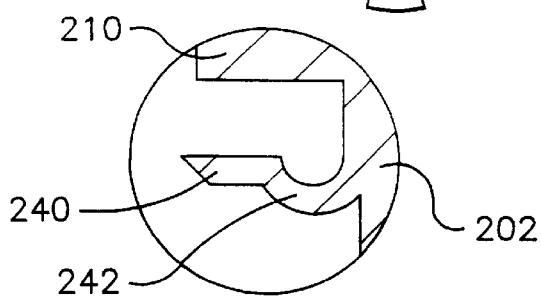
FIG. 6 is a detail view of the alternative sensor with the retaining ring in the retracted position as indicated by the circle 6 in FIG. 4.
Figure 7:
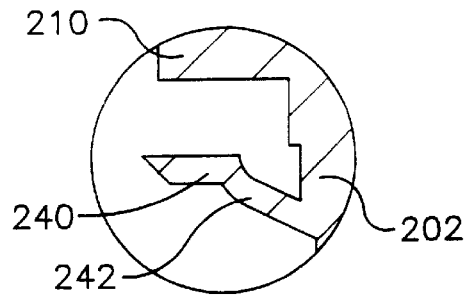
FIG. 7 is a detail view of the alternative sensor with the retaining ring in the extended position.

Having described the overall structure of the sensor 100, attention is now directed to FIGS. 6 and 7, which show the details of the retaining ring 212. As mentioned above and as shown in FIGS. 3 through 7, the retaining ring 212 is insert molded into the sensor housing 202. The retaining ring 212 includes a plurality of engagement teeth 240, each of which is supported by a resilient lateral support ring 242. FIG. 5 more clearly shows the engagement teeth 240 extending radially from the support ring 242.

Referring again to FIGS. 6 and 7, it is shown that the support ring 242 is temporarily deformable from a retracted position, as shown in FIG. 6, to an extended position, shown in FIG. 7. Accordingly, as the sensor 200 is pushed into the bore 222 formed in the transmission housing 220, the support ring 242 temporarily deforms to the extended position. When the sensor bottoms out, i.e., the concave exterior surface 208 of the distal end 206 of the sensor housing 202 engages the convex exterior surface 234 of the teeth 232 on the target wheel, the insertion force is released. When the insertion force is released, the temporarily deformed support ring 242 returns, under the influence of its material resiliency, to the retracted position and moves the sensor 200 back, i.e., upward looking at FIG. 3, to a predetermined distance from the target wheel 232, as shown in FIG. 3.

With the configuration of structures described above, it is to be appreciated that the self-retaining sensor can be securely mounted in a transmission housing without the necessity of a mounting bracket or bolts. Thus, the sensor can be inserted by an automated process without the need for a technician to manually install the sensors. Moreover, the air gap between the sensor and the corresponding target wheel can also be set automatically, thus obviating the need for a technician to set the air gap manually, and also reducing the stack up of the transmission and sensor assembly.

While the particular self-retaining sensor as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A self-retaining sensor for use in a vehicle transmission comprising:
    a sensor housing; and
    a retaining ring extending radially from the sensor housing, the retaining ring engaging an inner wall of a bore formed in a transmission housing to hold the sensor within the transmission housing.

2. The sensor of claim 1, wherein the sensor housing defines a distal end and the sensor further comprises:
    a target wheel slightly distanced from the distal end of the sensor housing, the target wheel having a plurality of teeth.

3. The sensor of claim 1, wherein the retaining ring is insert molded in the sensor housing.

4. The sensor of claim 1, further comprising a flange extending radially from the sensor housing.

5. The sensor of claim 1, wherein the sensor housing further defines a proximal end and the sensor further comprises a connector housing extending from the proximal end of the sensor housing, the connector housing being sized and shaped to receive a complementarily sized and shaped connector from a vehicle control system or a display.

6. The sensor of claim 4, wherein the flange is near the middle of the sensor housing and the retaining ring extends radially from the flange.

7. The sensor of claim 4, wherein the bore formed in the transmission housing comprises a first portion, a second portion and a sensor contact face therebetween, the diameter of the first portion being slightly larger than the diameter of the sensor housing, the diameter of the second portion being slightly smaller than the diameter of the retaining ring, the sensor being installed in the bore so that the flange contacts the sensor contact face and the retaining ring engages the second portion of the bore.

8. The sensor of claim 4, wherein the sensor housing defines a proximal end and the flange extends radially around the proximal end of the sensor housing and the retaining ring extends radially from the sensor housing beneath the flange.

9. The sensor of claim 8, wherein the diameter of the bore is slightly larger than the diameter of the flange and the diameter of the bore is slightly smaller than the diameter of the retaining ring, the retaining ring engaging the inner wall of the bore when the sensor is disposed within the bore.

10. The sensor of claim 9, wherein the sensor housing further defines a distal end and the sensor housing is installed within the transmission housing such that the distal end of the sensor housing is slightly distanced from a target wheel formed with plural teeth, the distal end of the sensor housing including an exterior surface having an at least partially concave curvature and each tooth on the target wheel includes an exterior surface having an at least partially convex curvature, the curvature of the exterior surface of the teeth mirroring the curvature of the exterior surface of the distal end of the sensor housing.

11. The sensor of claim 1, wherein the retaining ring includes a plurality of engagement teeth each supported by a lateral support ring, the lateral support ring being temporarily deformable from a retracted position to an extended position.

12. The sensor of claim 11, wherein the lateral support ring moves to the extended position as the sensor is inserted in the bore in the transmission housing and remains in the extended position until a concave exterior surface of the distal end of the sensor housing makes contact with a convex exterior surface of the teeth on the target wheel and the force of insertion is released allowing the lateral support ring to return to the retracted position.

13. A sensor assembly for use in a motor vehicle transmission comprising:
    a transmission housing formed with a bore;
    a self-retaining sensor disposed within the bore, the sensor being held in place by a retaining ring extending radially from the sensor, the sensor including a sensor housing; and
    a target wheel slightly distanced from the sensor, the target wheel having a plurality of teeth.

14. The sensor assembly of claim 13, wherein the retaining ring is insert molded in the sensor housing.

15. The sensor assembly of claim 13, wherein the self-retaining sensor further comprises a flange extending radially from the sensor housing.

16. The sensor assembly of claim 13, wherein the sensor housing further defines a proximal end and the sensor further comprises a connector housing extending from the proximal end of the sensor housing, the connector housing being sized and shaped to receive a complementarily sized and shaped connector from a vehicle control system or a display.

17. The sensor assembly of claim 15, wherein the flange is near the middle of the sensor housing and the retaining ring extends radially from the flange.

18. The sensor assembly of claim 15, wherein the bore formed in the transmission housing comprises a first portion, a second portion and a sensor contact face therebetween, the diameter of the first portion being slightly larger than the diameter of the sensor housing, the diameter of the second portion being slightly smaller than the diameter of the retaining ring, the sensor being installed in the bore so that the flange contacts the sensor contact face and the retaining ring engages an inner wall of the second portion of the bore.

19. The sensor assembly of claim 15, wherein the flange extends radially around the proximal end of the sensor housing and the retaining ring extends radially from the sensor housing beneath the flange.

20. The sensor assembly of claim 19, wherein the bore defines a diameter that is slightly larger than a diameter of the flange and the diameter of the bore is slightly smaller than a diameter of the retaining ring, the retaining ring engaging the inner wall of the bore when the sensor is disposed within the bore.

* * * * *